US010784746B2

(12) United States Patent
Bodla et al.

(10) Patent No.: US 10,784,746 B2
(45) Date of Patent: Sep. 22, 2020

(54) SYSTEMS AND METHOD FOR EMBEDDED DIRECT WINDING COOLING FOR ELECTRIC MACHINES

(71) Applicant: General Electric Company, Schenectady, NY (US)

(72) Inventors: Karthik Kumar Bodla, Watervliet, NY (US); Naveenan Thiagarajan, Schenectady, NY (US); Patel Bhageerath Reddy, Santa Clara, CA (US); Yogen Vishwas Utturkar, Latham, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 514 days.

(21) Appl. No.: 15/624,456

(22) Filed: Jun. 15, 2017

(65) Prior Publication Data

US 2018/0367011 A1    Dec. 20, 2018

(51) Int. Cl.
| H02K 9/04 | (2006.01) |
| H02K 3/24 | (2006.01) |
| H02K 15/02 | (2006.01) |
| H02K 15/10 | (2006.01) |

(52) U.S. Cl.
CPC ............... *H02K 9/04* (2013.01); *H02K 3/24* (2013.01); *H02K 15/024* (2013.01); *H02K 15/10* (2013.01)

(58) Field of Classification Search
CPC ........... H02K 3/32; H02K 3/34; H02K 3/345; H02K 9/04; H02K 9/005; C09K 13/00

USPC ......................................... 216/83; 310/58, 59
See application file for complete search history.

(56) References Cited

U.S. PATENT DOCUMENTS

| 4,277,705 | A | 7/1981 | Rios |
| 6,368,530 | B1 | 4/2002 | Adubato et al. |
| 6,731,028 | B2 | 5/2004 | Derleth et al. |
| 7,545,060 | B2* | 6/2009 | Ward ................. H02K 3/24 310/260 |
| 8,816,547 | B2 | 8/2014 | Le Besnerais |
| 8,922,072 | B2 | 12/2014 | Bott et al. |
| 9,099,900 | B2* | 8/2015 | Glubrecht ............. H02K 1/20 |
| 2012/0205996 | A1 | 8/2012 | Buettner et al. |
| 2013/0033145 | A1* | 2/2013 | Randolph ............ H02K 3/30 310/215 |
| 2013/0052343 | A1* | 2/2013 | Dieny .................. B22F 9/00 427/212 |
| 2014/0183988 | A1 | 7/2014 | Kulkarni et al. |
| 2014/0319959 | A1* | 10/2014 | Kaiser ................ H02K 3/345 310/215 |
| 2018/0030922 | A1* | 2/2018 | Kia ...................... F02F 1/16 |
| 2018/0030923 | A1* | 2/2018 | Coppola ............. F02F 1/002 |

OTHER PUBLICATIONS

Sachs et al., "Production of Injection Molding Tooling with Conformal Cooling Channels using The Three Dimensional Printing Process", pp. 448-467.

(Continued)

*Primary Examiner* — Jeremy A Luks
(74) *Attorney, Agent, or Firm* — Fletcher Yoder, P.C.

(57) ABSTRACT

A method includes fabricating a core, wherein the core comprises a chemically soluble first polymer, forming a body around the core, wherein the body comprises a second polymer, and etching away the core to reveal a cooling channel extending through the body.

14 Claims, 6 Drawing Sheets

(56) References Cited

OTHER PUBLICATIONS

Semidey S A et al., "Experimentation of an Electric Machine Technology Demonstrator Incorporating Direct Winding Heat Exchangers", Industrial Electronics, IEEE Transactions on, vol. 61, Issue: 10, pp. 5771-5778, Oct. 2014.

* cited by examiner

SYSTEMS AND METHOD FOR EMBEDDED DIRECT WINDING COOLING FOR ELECTRIC MACHINES

BACKGROUND

The subject matter disclosed herein relates to temperature regulation of electric machines, and more specifically, to cooling systems for electric machines.

Electric machines (e.g., generators and motors) may be used to convert mechanical energy into electrical energy, or vice versa. Electric machines typically include a plurality of conductors bound together (e.g., a winding) and routed along a path throughout the electric machine, resulting in a plurality of windings disposed circumferentially within the electric machine. The conductors may then be electrically coupled to one another by end windings. The windings of an electric machine generate a substantial amount of heat. To dissipate heat, an electric machine may be outfitted with an externally positioned cooling jacket that surrounds the electric machine and draws heat from the electric machine. However, the effectiveness of heat dissipation by the externally positioned cooling jacket limits the operational capabilities of the electric machine.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a method includes fabricating a core, wherein the core comprises a chemically soluble first polymer, forming a body around the core, wherein the body comprises a second polymer, and etching away the core to reveal a cooling channel extending through the body.

In a second embodiment, cooling slot liner for an electric machine includes a core and a cooling slot liner body formed around the core. The core includes a chemically-soluble first polymer. The cooling slot liner body includes a second polymer. Flowing an etching fluid through the cooling slot liner body etches away the core to reveal a cooling channel. The cooling slot liner is configured to be installed within a stator slot of an electrical machine, adjacent one or more conductors. Flowing a coolant through the cooling channel draws heat from the one or more conductors.

In a third embodiment, an electric machine includes a stator and a rotor disposed circumferentially within the stator and configured to rotate within the stator. The stator includes a stator body having a plurality of stator walls defining a stator slot, one or more conductors extending through the stator slot, and a cooling slot liner disposed between one or more of the plurality of stator walls and the one or more conductors. The cooling slot liner defines a cooling channel through which coolant is flowed to dissipate heat from the one or more conductors. The cooling slot liner includes a polymer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure includes systems and methods for cooling electric machines by dissipating heat from the conductors. Specifically, cooling slot liners are formed by forming a core with exterior dimensions that correspond to interior dimensions of a designed cooling channel. A cooling slot liner body may then be formed around the core. The core is then removed (e.g., via chemical etching or chemical dissolution) to expose a cooling channel through the cooling slot liner. The cooling slot liner is installed in the stator slot (e.g., between a wall of the stator slot and the conductors). During operation, coolant flows through the cooling channel of the cooling slot liner and draws heat away from the conductors to cool the electric machine. Similarly, a cooling end cap may be formed by forming a core with exterior dimensions that correspond to interior dimensions of a designed cooling channel. A cooling end cap body may then be formed around the core. The core is removed (e.g., via chemical etching or chemical dissolution) to expose a cooling channel through the cooling end cap. The cooling end cap is installed at one or both ends of the stator. An end winding ring or end windings may be disposed at one or both ends of the stator and configured to electrically couple conductors to one another. The end winding ring or the end windings may couple to the cooling end cap or extend through the cooling end cap. During operation, the cooling end cap draws heat away from the end winding ring or end windings to cool the electric machine.

Figure 1:
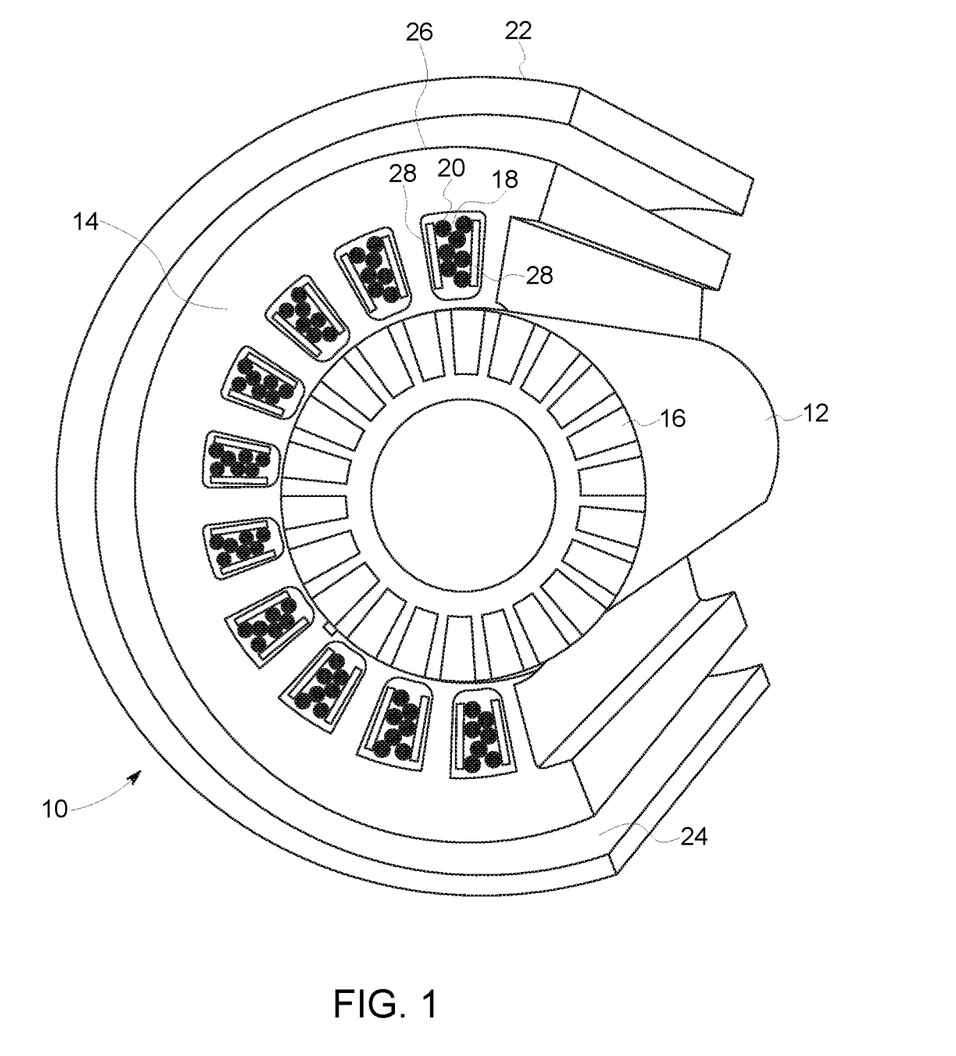
FIG. 1 is a cut-away view of one embodiment of an electric machine with windings having cooling slot liners, in accordance with an embodiment.

FIG. 1 is a cut-away view of one embodiment of an electric machine 10 (e.g., an electric motor or a generator). The electric machine 10 includes a rotor 12 that rotates within a stator 14. The rotor 12 may include a plurality of magnets 16. The stator 14 may include windings 18 disposed circumferentially about the rotor 12. In some embodiments, both the rotor 12 and the stator 14 may have windings 18. For generators, as the rotor 12 rotates within the stator 14, a voltage is created by way of magnetic induction, thus converting mechanical energy into electrical energy. For motors, alternating electric currents through the windings 18 create magnetic fields that cause the rotor 12 to rotate within the stator 14. It should be understood, however, that in some embodiments the placement of the magnets 16 and windings 18 may be reversed. That is, in some embodiments the windings 18 may be a part of the rotor 12 and the magnets 16 may be part of the stator 14. Further, the disclosed techniques may be used with linear motors and/or generators with a linear air gap and a rotor that moves along a path parallel to the stator.

Windings 18 typically include bundled conductors 20 (e.g., individually insulated strands of copper), which may be wrapped in mica tape or paper, and/or ground wall insulation. The currents flowing through the conductors 20 generates a substantial amount of heat. In some cases, the operational capabilities (e.g., power density, torque density, etc.) of the electric machine 10 may be dependent upon its ability to dissipate heat. To help with temperature regulation, the electric machine 10 may be outfitted with a cooling jacket 22, which surrounds the electric machine 10. An annular space 24 disposed between the electric machine 10 and the cooling jacket 22 may be filled with a fluid (e.g., a coolant). In operation, the electric machine 10 may be suspended in the coolant as the coolant draws heat away from the electric machine. The coolant may be stationary within the annular recess, or the coolant may flow (as in a heat pipe), to provide convective heat transfer. In some embodiments, other convective cooling techniques (e.g., spraying coolant, using a fan or blower to move air, etc.) may be used at either end of electric machine 10, where end windings connect various windings 18.

While these cooling techniques may help to dissipate heat from an electric machine, because heat is only drawn from the radially exterior surface 26 of the electric machine 10, or at either end, heat may build up toward the interior of the electric machine 10. Accordingly, in the illustrated embodiment, the windings 18 include cooling slot liners 28 on either side of each winding 18 that define one or more cooling channels through which coolant may flow to dissipate heat from the interior of the electric machine 10. As will be described in more detail below, the cooling slot liners 28 may be made of a polymer (e.g., epoxy) that is formed around a polymer structure, such as polyvinyl alcohol (PVA), some other water-soluble polymer, or other chemically soluble polymers. The polymer structure is then etched away to reveal a cooling channel within the cooling slot liner 28. During operation, coolant in the cooling channel draws heat away from the windings 18.

Figure 2:
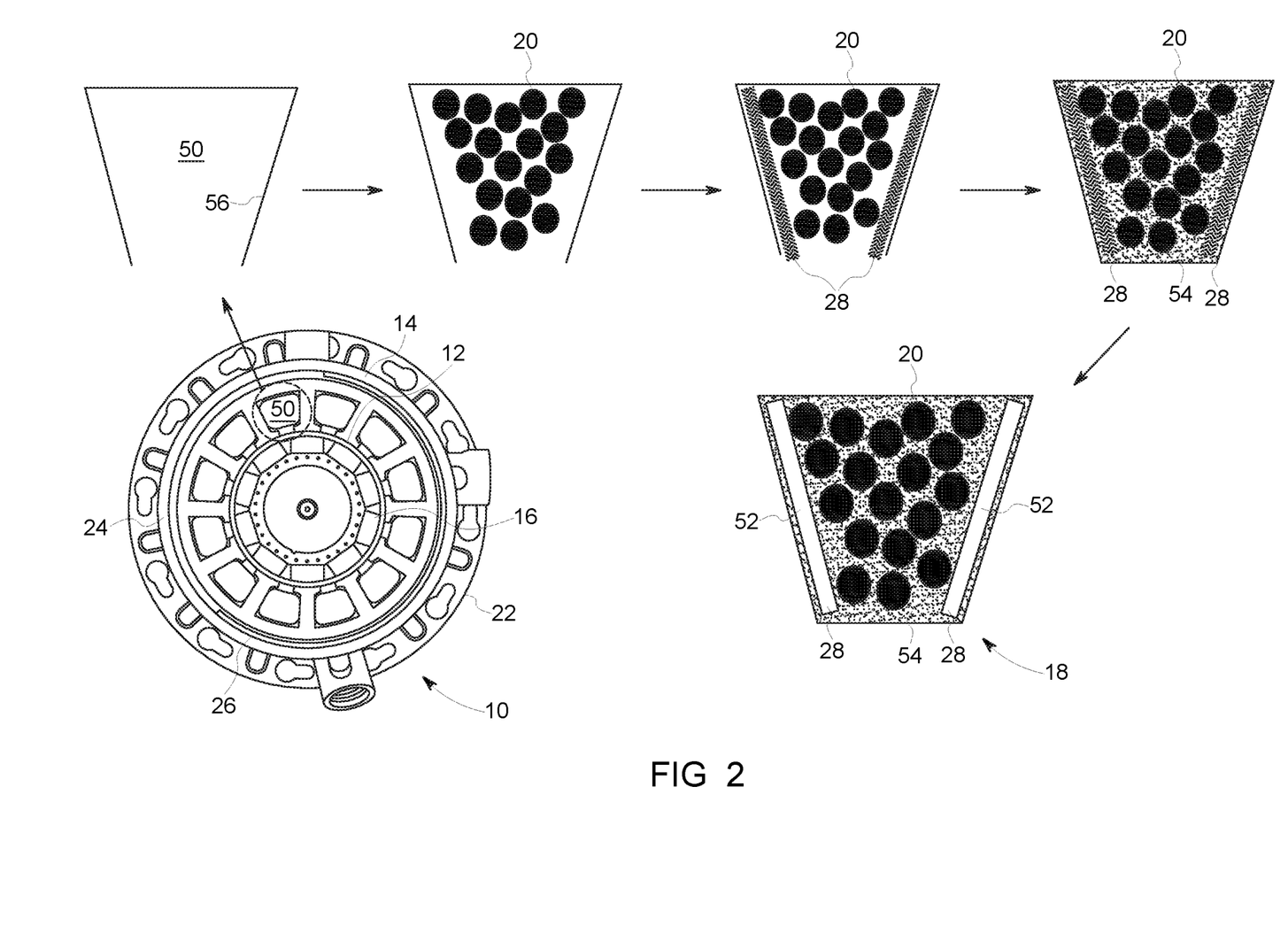
FIG. 2 is a schematic illustrating assembly of the windings shown in FIG. 1, in accordance with an embodiment.

FIG. 2 is a schematic illustrating assembly of the windings 18, in accordance with an embodiment. As shown, the stator 14 of the electric machine 10 defines a plurality of slots 50 disposed circumferentially about the stator 14. The slots 50 house the windings 18, which may be assembled within respective slots 50, or partially or fully assembled outside a respective slot 50 and then inserted into the respective slot 50. As shown, a plurality of conductors 20 may be would through each stator slot 50. The cooling slot liners 28 may then be inserted into each stator slot 50. In some embodiments, the cooling slot liners 28 may be inserted into the stator slots 50 before the conductors 20. At the time of installation, one or more cooling channels 52 may or may not have been etched into the cooling slot liners 28 (e.g., by etching away the PVA or other dissolvable core). A vacuum pressure impregnation (VPI) process may then be used to fill each stator slot 50 with a resin 54 that fills in the gaps between the conductors 20. If the cooling channels 52 have not been etched into the cooling slot liners 28, water is flowed through the cooling channels 52 to etch away the PVA or other dissolvable core.

As illustrated, when complete, the winding includes a plurality of conductors 20 extending through the stator slot 50 and suspended in a resin 54. One or more cooling slot liners 28 extend along interior surfaces 56 of the slot 50. Extending through one or more of the cooling slot liners 28 are one or more cooling channels 52 through which a coolant may flow. During operation, coolant in the cooling channels 52 of the cooling slot liners draws heat away from the conductors 20, allowing the electric machine 10 to operate at higher currents and voltages that previously possible without the corresponding pockets of high temperatures toward the interior of the electric machine 10.

Figure 3:
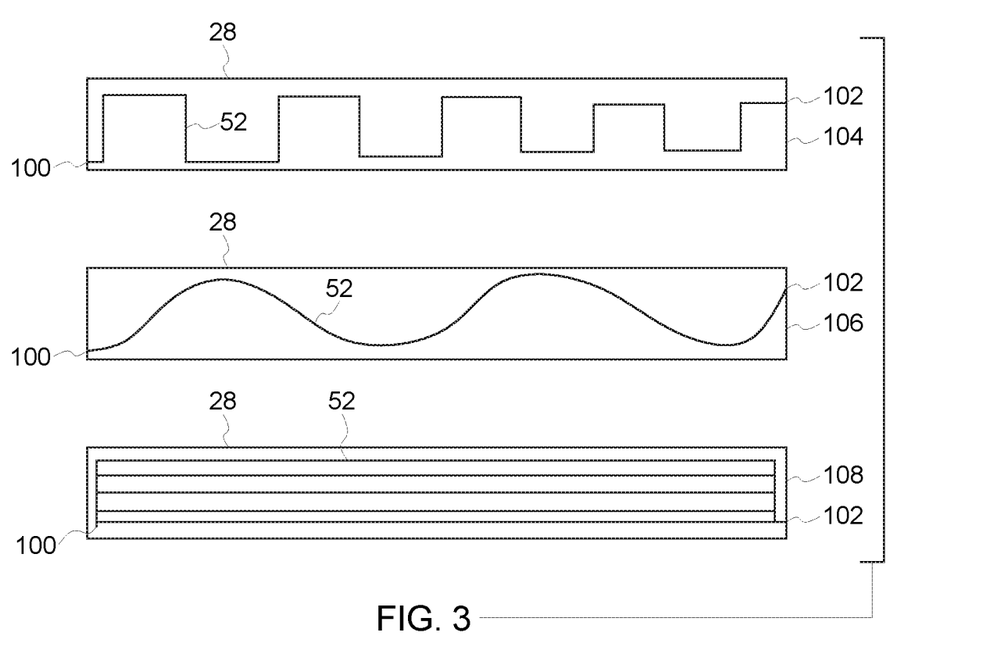
FIG. 3 is a side view of several different possible embodiments of the cooling slot liner shown in FIG. 2.

FIG. 3 is a side view of several different possible embodiments of the cooling slot liner 28. In general, the coolant enters the cooling slot liner 28 via an entry 100 and then proceeds through the cooling channel 52 toward an exit 102. In a first embodiment 104, the cooling channel 52 generally resembles a square wave. In a second embodiment 106, the cooling channel 52 generally resembles a sinusoidal wave. A third embodiment 108 of the cooling slot liner 28 includes multiple cooling channels through which coolant flows in parallel. That is, fluid enters the cooling slot liner 28 via the entry 100, is then dispersed to multiple cooling channels (e.g., like a manifold). The cooling channels then convene and the coolant exits the cooling slot liner 28 via the exit 102. It should be understood, however, that the embodiments 104, 106, 108 of the cooling slot liners 28 shown in FIG. 3 are merely three of many possible envisaged designs. Accordingly, each cooling slot liner 28 may have one cooling channel 52 or multiple cooling channels 52. Each of the cooling channels may take on any shape as it extends through the cooling slot liner 28. Similarly, for embodiments of the cooling slot liner having multiple cooling channels 52, the cooling channels 52 may share one or more entries 100 and one or more exits 102, or each cooling channel 52 may have its own entry 100 and exit 102. It should be understood, however, that other embodiments could include cooling channels 52 of different cross-sections, and/or variable cross-sectional area and shape along the length of channel. Cooling channels 52 could run serially in a coil or convoluted patterns, or in a parallel network. Internal surfaces of channels 52 could have features such as studs, fins or other features to increase surface area and/or trigger turbulence.

Figure 4:
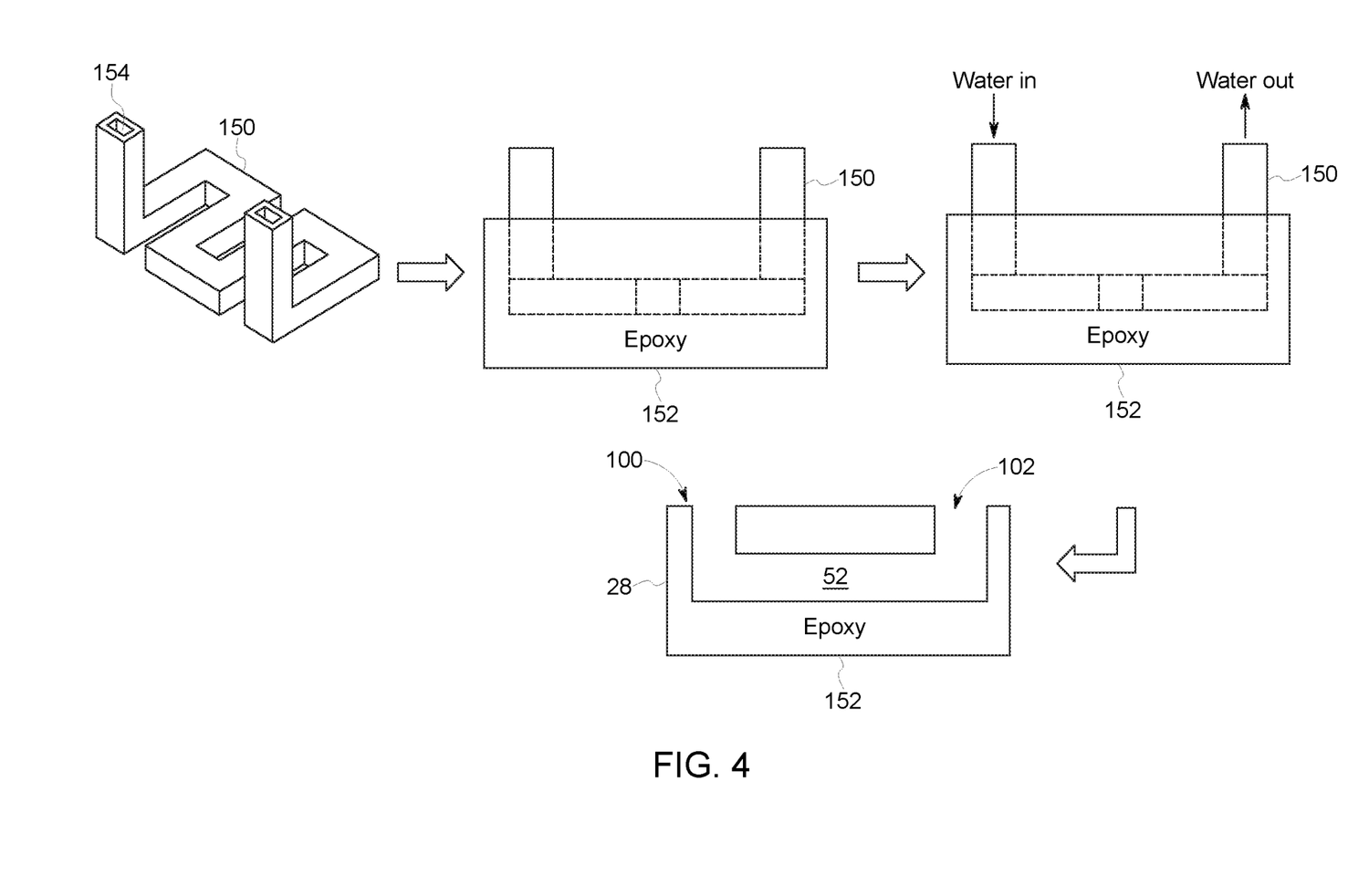
FIG. 4 is an illustration of how the cooling slot liners of FIG. 2 are formed, in accordance with an embodiment.

FIG. 4 is an illustration of how the cooling slot liners 28 are formed. As illustrated, a core 150 is formed such that the exterior dimensions of the core 150 approximate the interior dimensions of the designed cooling channel. In the illustrated embodiment, the core 150 is formed of PVA using 3D printing or other additive manufacturing approaches. However, the core 150 may be formed of other polymers (e.g., water-soluble polymers, other chemically-soluble polymers, other polymers, or organic compounds, such as wax) and/or by other methods (e.g., molding, extruding, machining, etc.). Further, though the core 150 shown in FIG. 4 is hollow (e.g., the core 150 defines a central passage 154), such that fluid solvent may flow through the core 150, in other embodiments, the core 150 may be solid. A liner body 152 may then be formed around the core 150. The liner body 152 may be made of epoxy, or some other resin. If the core 150 is chemically soluble, then the material for the liner body should be selected such that a fluid that dissolves that material that forms the core 150 does not dissolve the material that forms the liner body 152.

If the core 150 is made of a material that is water-soluble, water is flowed through the core 150 or brought into contact with the core 150 such that the water etches away the core 150, exposing the cooling channel 52 in the liner body 152. If the core 150 is chemically-soluble, but not water-soluble, a chemical that dissolves the core 150 is used in place of water. In other embodiments, heat, pressure, or other environmental conditions may be used to etch away the core 150 in addition to, or in place of, flowing a fluid. As illustrated, once the core 150 is etched away, the liner body 152 becomes the cooling slot liner 28, defining one or more cooling channels 52, having an entry 100 and an exit 102. The cooling slot liner 28 may then be installed in a stator slot 50 along with a plurality of conductors 20 and a resin 54. In operation, coolant is flowed through the cooling channel 52 to draw heat away from the conductors 20.

Figure 5:
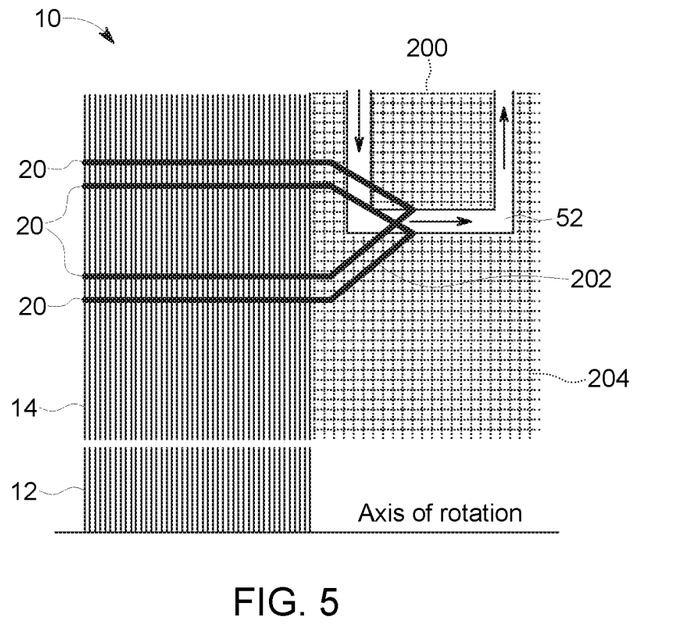
FIG. 5 is a schematic of a cooling end cap for convective fluid cooling of end windings of the electric machine of FIG. 1, in accordance with an embodiment.
Figure 6:
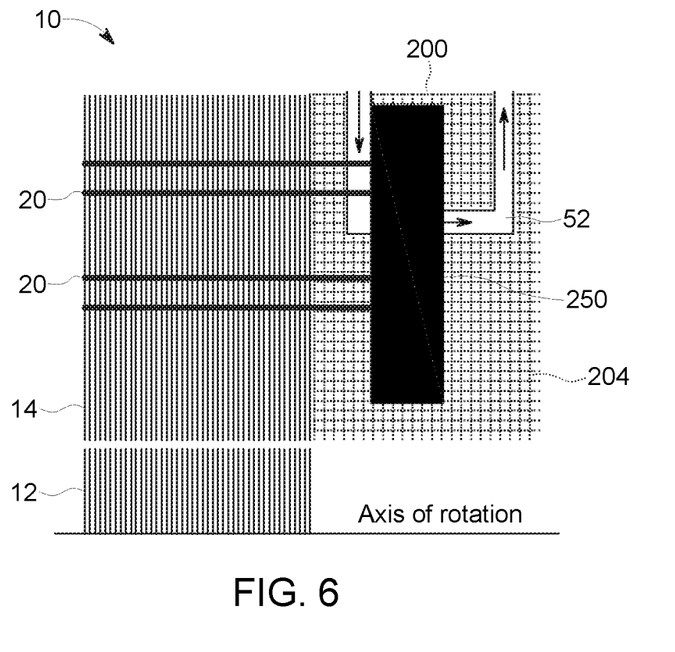
FIG. 6 is a schematic of the cooling end cap for convective fluid cooling of an end winding ring of the electric machine of FIG. 1, in accordance with an embodiment.

Though FIGS. 1-3 describe use of the disclosed techniques within the windings, the disclosed techniques may also be utilized to improve cooling of end windings. FIGS. 5 and 6 illustrate two different embodiments that utilize the disclosed techniques for end windings. FIG. 5 is a schematic of a cooling end cap 200 for convective fluid cooling of end windings 202. As previously described, conductors 20 extend through slots 50 in the stator 14. End windings 202 may be used at either end of the electric machine 10 to electrically couple one conductor 20 to another. Typically, end windings 202 are cooled, if at all, by spraying the end windings 202 with a fluid (e.g., coolant, water, etc.), or by circulating air using fans or blowers. In the instant embodiment, a cooling end cap 200 includes one or more cooling channels 52 through which coolant (e.g., dielectric coolant) may flow. Portions of the end windings 202 may extend through the cooling channels 52. As coolant flows through the cooling channel and around the end windings 202, heat is dissipated from the end windings 202. The cooling end cap 200 may be formed in much the same way as the cooling slot liners. That is, a core may be formed (e.g., via 3D printing, molding, machining, extruding, etc.) of a chemically-soluble polymer (e.g., PVA) such that the exterior dimensions of the core correspond to the interior dimensions of the designed cooling channel. A cooling end cap body 204 formed around the core. The core may then be etched away by flowing water or some other fluid through the core. In some other embodiments, heat and/or pressure may be used in place or in addition to flowing a fluid through the core.

FIG. 6 is a schematic of a cooling end cap 200 for convective fluid cooling of an end winding ring 250. In some embodiments, the end winding ring 250 may be used to electrically couple conductors to one another instead of end windings 202. In such an embodiment, the cooling end cap body 204 may be formed around the core and the end winding ring 250. The core is then etched away or otherwise removed to reveal the cooling channel 52. As coolant flows through the cooling channel, coolant contacts the end winding ring 250 and dissipates heat from the end winding ring 250.

Figure 7:
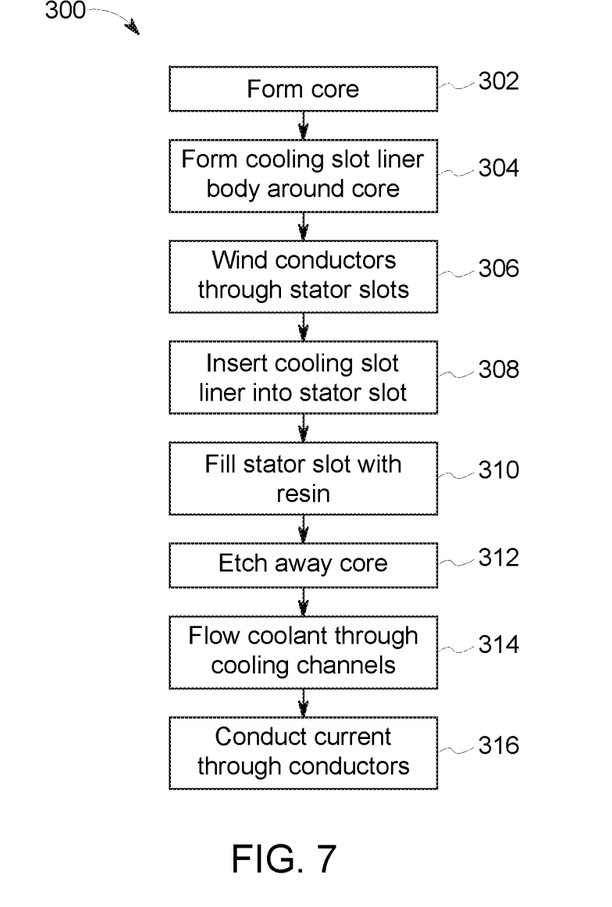
FIG. 7 is a flow chart for a process for manufacturing the cooling slot liners of FIG. 2, and assembling and operating the electric machine, in accordance with an embodiment.

FIG. 7 is a flow chart for a process 300 for manufacturing cooling slot liners for use in an electric machine, and assembling and operating the electric machine. In block 302, a core is formed. The exterior dimensions of the core generally correspond to the interior dimensions of the designed cooling channel. The core may be 3D printed, molded, extruded, machined, or formed in some other way. In the illustrated embodiment, the core is made of PVA, a water-soluble polymer. However, the core may be made of other water-soluble polymers, chemically-soluble polymers, or other types of polymers.

In block 304, the cooling slot liner body is formed around the core. The cooling slot liner body may be made of a polymer or other material that remains when the core is removed. That is, if the core is made of PVA, or another water-soluble polymer, the cooling slot liner body is made of a material that is not water-soluble. Similarly, if the core is made of a chemically-soluble polymer, the cooling slot liner body is made of a polymer that is not soluble in the chemical used to etch away the core. In embodiments in which the core is removed using heat, pressure, or other environmental conditions, the material that forms the cooling slot liner body is selected from materials able to sustain those environmental conditions while the core is being removed.

In block 306, the conductors are installed in the stator slot, in the instant embodiment, the conductors are wound through the stator slots generally parallel to the axis of the stator. In other embodiments, the conductors may be inserted into the stator slots radially. In further embodiments, the conductors may be bundled before installation.

In block 308, the one or more cooling slot liners are inserted into the stator slot. The cooling slot liner may generally abut a wall of the stator slot, disposed between the wall of the stator slot and the conductors. In block 310, the stator slot is filled with resin, (e.g., according to a VPI process) filling the gaps between conductors, and allowed to cure.

In block 312, the core is removed from the cooling slot liner. In the instant embodiment, water is flowed through the core, dissolving the core and exposing a cooling channel through the cooling slot liner body. In other embodiments, the core may be etched away using a fluid other than water. In further embodiments, heat or pressure may be used in place of, or in addition to, using a fluid to remove the core.

In block 314, a coolant fluid (e.g., dielectric fluid, such as dielectric oil) is flowed through the cooling channels of the cooling slot liners. In some embodiments, a pump or some other device may be used to circulate coolant. In other embodiments, variations in atmospheric conditions within the cooling channel may cause the coolant to flow (e.g., as in a heat pipe). In further embodiments, the fluid may remain stationary once the cooling channels have been filled. In block 316, the electric machine may be operated by utilizing the conductors to conduct current.

It should be understood that the flow chart of the process 300 in FIG. 7 is not intended to require that the blocks occur in the order shown. For example, the cores may be removed from the cooling slot liners before the cooling slot liners are installed in the stator slot. Further, the cooling slot liners may be installed in the stator slot before the conductors. Along these lines, it should be understood that some embodiments of the process 300 may omit one or more blocks, and/or perform the blocks in a different order. Further, similar blocks may be performed for cooling end caps instead or, or in addition to, the cooling slot liners.

The present disclosure includes systems and methods for cooling electric machines by dissipating heat from the conductors. Specifically, cooling slot liners are formed by forming a core with exterior dimensions that correspond to interior dimensions of a designed cooling channel. A cooling slot liner body may then be formed around the core. The core is then removed (e.g., via chemical etching) to expose a cooling channel through the cooling slot liner. The cooling slot liner is installed in the stator slot between a wall of the stator slot and the conductors. During operation, the cooling slot liner draws heat away from the conductors to cool the electric machine. Similarly, a cooling end cap may be formed by forming a core with exterior dimensions that correspond to interior dimensions of a designed cooling channel. A cooling end cap body may then be formed around the core. The core is removed (e.g., via chemical etching) to expose a cooling channel through the cooling end cap. The cooling end cap is installed at one or both ends of the stator. An end winding ring or end windings that connect conductors extend through the cooling end cap and contact the fluid flowing through the cooling channels. During operation, the cooling end cap draws heat away from the end winding ring or end windings to cool the electric machine. Improving the cooling of the electric machine allows the electric machine to operate at high loads, high power densities, and higher torque densities without corresponding increases in temperature.

This written description uses examples to disclose the claimed subject matter, including the best mode, and also to enable any person skilled in the art to practice the disclosed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
fabricating a core, wherein the core comprises a chemically soluble first polymer;
forming a cooling slot liner for an electric machine around the core, wherein the cooling slot liner comprises a second polymer; and
etching away the core to reveal a cooling channel extending through the cooling slot liner, wherein a cross section of the cooling channel is fully enclosed by the cooling slot liner.

2. The method of claim 1, comprising installing the body within an electric machine, adjacent a conductor, and flowing a coolant through the cooling channel.

3. The method of claim 2, wherein installing the body within an electric machine comprises inserting the body into a stator slot of the electric machine.

4. The method of claim 3, comprising:
installing one or more conductors within the stator slot of the electric machine, and filling the stator slot with resin.

5. The method of claim 2, wherein installing the body within the electric machine comprises coupling the body to an end of a stator of the electric machine.

6. The method of claim 5, wherein the conductor is an end winding, an end winding ring, or a combination thereof.

7. The method of claim 1, wherein the core comprises a water-soluble polymer.

8. The method of claim 7, wherein the core comprises polyvinyl alcohol (PVA).

9. A cooling slot liner for an electric machine, comprising:
a core comprising a chemically-soluble first polymer; and
a cooling slot liner body formed about the core, wherein the cooling slot liner body comprises a second polymer;
wherein flowing an etching fluid through the cooling slot liner body etches away the core to reveal a cooling channel, wherein a cross section of the cooling channel is fully enclosed by the cooling slot liner body, wherein the cooling slot liner is configured to be installed within a stator slot of an electrical machine, adjacent one or more conductors, and wherein flowing a coolant through the cooling channel draws heat from the one or more conductors.

10. The cooling slot liner of claim 9, wherein the first polymer is water-soluble.

11. The cooling slot liner of claim 10, wherein the first polymer comprises polyvinyl alcohol (PVA).

12. The cooling slot liner of claim 9, comprising:
an entry fluidly coupled to the cooling channel; and
an exit fluidly coupled to the cooling channel.

13. The cooling slot liner of claim 9, comprising a plurality of cooling channels extending through the cooling slot liner body.

14. The cooling slot liner of claim 9, wherein the core defines a central passage through which the etching fluid flows.

* * * * *